United States Patent [19]

Bykhovsky et al.

[11] 3,997,756
[45] Dec. 14, 1976

[54] METHOD FOR STRIKING MAIN ARC BETWEEN THE ELECTRODE OF PLASMATRON AND WORKPIECE, AND CONTRIVANCE EMBODYING SAME

[76] Inventors: David Grigorievich Bykhovsky, Konjushenny pereulok, 1/6, kv. 18; Alexandr Yakovlevich Medvedev, ulitsa Kalyaeva, 3, kv. 17; Alexandr Yakovlevich Finkelshtein, ulitsa Belgradskaya, 24, kv. 13; Jury Alexandrovich Bogorodsky, prospekt Mechnikova, 14, kv. 163; Mikhail Isaakovich Zax, ulitsa Shkolnaya, 3, kv. 4, all of Leningrad, U.S.S.R.

[22] Filed: June 21, 1974

[21] Appl. No.: 481,821

[52] U.S. Cl. .......................... 219/121 P; 315/111.2
[51] Int. Cl.² ............................................. B23K 5/00
[58] Field of Search .... 219/121 P, 131 R, 131 WR, 219/74, 75, 130, 137 PS, 137 R, 135; 315/111.2

[56] References Cited
UNITED STATES PATENTS

| 3,174,027 | 3/1965 | Manz | 219/131 R |
|---|---|---|---|
| 3,354,289 | 11/1967 | Haase et al. | 219/131 R |
| 3,555,234 | 1/1971 | Lepp et al. | 219/135 X |
| 3,586,817 | 6/1971 | Manz | 219/131 R |
| 3,594,541 | 7/1971 | Gorman et al. | 219/131 R X |
| 3,694,619 | 9/1972 | Mahuljsen et al. | 219/130 |
| 3,781,508 | 12/1973 | Dauer et al. | 219/121 P |
| 3,809,850 | 5/1974 | Saenger, Jr. | 219/121 P |

*Primary Examiner*—J. V. Truhe
*Assistant Examiner*—G. R. Peterson
*Attorney, Agent, or Firm*—Holman & Stern

[57] ABSTRACT

In a method for striking a main arc between the electrode and nozzle of a plasmatron there is initiated with the aid of high-frequency discharge an intermittently-arcing pilot arc whose flame bridges under the influence of a gas fed into the plasmatron the gap between the electrode of plasmatron and workpiece, completing thereby the circuit of main arc. The amplitude of pilot arc current is selected so as to be roughly equal to the steady current of the main arc whereas the frequency and on-off time ratio of the current are selected so as to assure that the flame of pilot arc is sustained unceasingly throughout the arcing of visually-monitored pilot arc. The method for striking a main arc is embodied in an apparatus wherein the electrode and nozzle of the plasmatron are connected to opposing terminals of a source of power so that interconnected between the electrode and nozzle of plasmatron there is an oscillator and between the nozzle and source of power is a RC-circuit serving as a switching device in the electrode-to-nozzle circuit and, further, the nozzle and workpiece are interconnected by the RC-circuit and an inductance, L, connected in series.

8 Claims, 6 Drawing Figures

METHOD FOR STRIKING MAIN ARC BETWEEN THE ELECTRODE OF PLASMATRON AND WORKPIECE, AND CONTRIVANCE EMBODYING SAME

BACKGROUND AND SUMMARY OF THE INVENTION

The present invention relates to plasma working of electrically-conductive materials, and more specifically to a method for striking a main arc between an electrode of a plasmatron and workpiece, and apparatus embodying same.

The preferable field of application of the invention disclosed is plasma working of electrically-conductive materials in oxidizing plasma-forming media with the use of electrodes based on zirconium or hafnium as, for example, manual air-plasma cutting of metals by means of an air-cooled plasmatron.

Furthermore the present invention may find application in plasma working of electrically-conductive materials in a variety of chemically-active plasma-forming media such as hydrocarbons and gaseous by-products of the processes of carbonising coal and melting metals, etc.

There is widely known in the art a method of striking a main arc between the electrode of a plasmatron and a workpiece. In the known method, the process of striking a main arc falls into two phases. Initially, a high-voltage discharge is brought about between the electrode and nozzle of a plasmatron with the aid of an oscillator to initiate a pilot arc whose cathode and anode spots are located on the electrode and nozzle while a flow of ionized gas, i.e., the visible flame of pilot arc, is issuing from the passage in the nozzle throughout the entire period of the arcing of pilot arc. At the next stage, provided the flame reaches the surface of the workpiece and the potential applied between the electrode of the plasmatron and workpiece is sufficiently high to sustain an electric arc, the main arc is struck between the electrode of the plasmatron and the workpiece.

The process described is embodied in a known apparatus which includes a d.c. power source one of the whose terminals is connected to the electrode of a plasmatron provided with a nozzle insulated from the electrode and with means of feeding a plasma-forming gas while the other terminal is connected to the workpiece through a main arc current transducer. In the known apparatus, the nozzle of the plasmatron is connected to a d.c. power source in series with a resistor and a switching device which form the circuit of the pilot arc. Interposed into the circuit between the nozzle and electrode of the plasmatron there is also an oscillator.

The known apparatus provides for a reliable striking of a pilot arc arcing unceasingly between the electrode and nozzle of the plasmatron until the main arc is struck. When atomic gases are being used as the plasma former, no thermal deterioration of the nozzle takes place even if the current of the pilot arc arcing during a protracted period is of a high magnitude. Thus the known apparatus has come into widespread use when an atomic gas, as argon for example, is used as the plasma-forming medium.

Yet if a molecular gas is employed in the capacity of plasma-forming medium, the known apparatus is of little help. The point is that in apparatus for plasma working by means of an external arc produced in a molecular gas when the length of nozzle passage is an inherently limited one, the anode spot of pilot arc shifts itself to the end face of the nozzle, bringing about an erosion of the nozzle at a high rate and destroying the nozzle. Furthermore, the current of pilot arc can practically be not lower than 60 to 80 A in this case because an attempt to lower the current results in a sharp increase in the floating voltage of power source up to a level hazardous to the personnel, particularly if the job entails manual plasma working. On the other hand, if the current of the pilot arc arcing unceasing in an atmosphere of molecular gas is maintained at said level, this brings about rapid thermal deterioration of a water-cooled nozzle and an almost instantaneous ruining of a gas-cooled one.

Known in the art is apparatus for welding and cutting with the aid of a plasma jet (see U.S. Pat. No. 3,174,027 of Mar. 16, 1965, by the same authors and German Pat. No. 1,236,692 granted in the Federal Republic of Germany on Mar. 16, 1967) wherein for initiating a main arc between the electrode of plasmatron and the workpiece there is struck repeatedly and for a short while a pilot arc, the latter being turned off while the main arc is arcing. Serving this purpose is a known RC-curcuit or a switching device in the circuit of the pilot arc ("Electrooborudovanie novoi universalnoi ustanovki dlya gascelectricheskoi reski metallov" by D. C. Bykhovsky and Yu. A. Bogorodsky, "Electro-promyshlenoost i priborostroenie", No. 22, 1960).

Said method and the apparatus embodying same eliminate the thermal erosion of the nozzle and provide for a failproof striking of the main arc in atomic gases, the distance between the plasmatron and workpiece being within the range of 5 to 10 cm in this case.

However, studies have revealed, on one hand, that under the conditions when a molecular gas or a mixture of molecular gases is used for plasma forming said apparatus for striking a main arc fails to assure failproof closing of the circuit between the electrode of the plasmatron and workpiece by means of a flow of ionized gas (flame of pilot arc) coming into being due to a current passing through the circuit of pilot arc, on the other hand, which is the main point, some of the current pulses in the circuit of the pilot arc. viz., those passing at a low on-off time ratio, fail to heat the active surface of the electrode where the cathode spot of arc is located to a temperature required in operation.

It is thus obvious that the use of chemically active gases and mixtures thereof as the plasma-forming medium practically brings to nothing all the advantages offered when a main arc is being struck by means of a periodically interrupted pilot arc because in this case the known method and apparatus embodying same arc is not capable of providing for a failproof striking of the main arc.

It is an object of the present invention to improve the reliability of striking a main arc in molecular gases.

Another object of the present invention is to obtain a continuous visually-monitored flame of a pilot arc of considerable intensity for striking a main arc in a medium of chemically active gases under the conditions of high rates of gas flow.

A further object of the present invention is to increase the distance between the electrode of the plasmatron and workpiece at the instant of striking the main arc.

These and other objects are attained by the fact that in a method for striking a main arc between the electrode of a plasmatron and workpiece wherein an intermittently-arcing pilot-arc is initiated by a high-frequency discharge and the flame of the pilot arc bridges the gap between the electrode of the plasmatron and workpiece due to the influence of a gas fed into the plasmatron, making thereby the circuit of main arc, the amplitude of the pilot arc current is selected in accordance with the invention so that it is roughly equal to the steady current of the main arc and the frequency and on-off time ratio of the current are selected so as to assure that the flame of the pilot arc is sustained unceasingly throughout the arcing of the visually-monitored pilot arc.

In a method for striking a main arc between the electrode of a plasmatron and the workpiece it is expedient that the amplitude of the pilot arc current is selected with in the range $$i \approx I - 3I,$$

where
 $i$ = amplitude of pilot arc current;
 $I$ = steady current of main arc;
and the frequency and on-off time ratio of the current are selected so as to assure that the average current in the circuit of pilot arc is between 3 and 10 A throughout the arcing of the arc.

In a method for striking a main arc it is further expedient to select the amplitude of pilot arc current within the range $$i = 0.8 I - 3 I,$$

where
 $i$ = amplitude of pilot arc current;
 $I$ = steady current of main arc.

It is also expedient that in a method for striking a main arc the amplitude of pilot arc current is 600 A.

In apparatus embodying the method, the electrode of the plasmatron is connected to one of the terminals of a power source which has an oscillator connected between the electrode and nozzle of the plasmatron and the other terminal of the source of power is connected to the nozzle through a switching device in the electrode-to-nozzle circuit which provides for an intermittent current in said circuit required for striking a main arc in the gap between the electrode and workpiece when a plasma-forming gas is fed between the electrode and nozzle, the electrode and nozzle being interconnected according to the invention by said switching device connected in series with an inductance.

It is preferable to use a known RC-circuit as the switching device and to connect a silicon diode between the nozzle and RC-circuit so that the diode conducts the pilot arc current.

It is also preferable to use a variable resistance $R_1$ in the $R_1C$ circuit and to link up the resistance with an actuator capable of changing the magnitude of the resistance and interconnected with a main arc current transducer, the minimum value of resistance $R_1$ being preferably selected when a pilot arc is arcing and the maximum one when the main arc is arcing.

It is further preferable to connect a switch into the RC-circuit in series with the resistor R so that said switch makes the circuit when a pilot arc is arcing and breaks the circuit when the main arc is arcing.

Compared with the known method and apparatus embodying same, the method and apparatus disclosed offer a number of advantages such as:
 failproof striking of main arc in a medium of molecular gases or mixtures thereof;
 producing a visually-monitored unceasing flame of highintensity pilot arc which assures failproof striking of main arc in a medium of chemically active gases flowing at a high rate;
 cooling all parts of the plasmatron with gas so that a miniature apparatus for manual air-plasma working is a practical possibility;
 saving on the cost of manufacturing the apparatus for striking main arc thanks to smaller dimensions, lower weight and cost of the pilot arc-inducing circuitry;
 recourse to move advanced sources of power for plasma working in a medium of molecular gases or mixtures thereof (thyratrons, for example);
 elimination of double arcing should the electrical conditions or the conditions of gas flow sustaining the arcing change sharply, this elimination being possible due to the use of a diode conducting the current in pilot arc circuit in the corresponding direction.

The invention will be best understood from the following description of preferred embodiments when this description is read in conjunction with the accompanying drawings in which FIG. 1 is a circuit diagram embodying the known method of striking a main arc with the aid of an unceasingly-arcing pilot arc;

Figure 2:
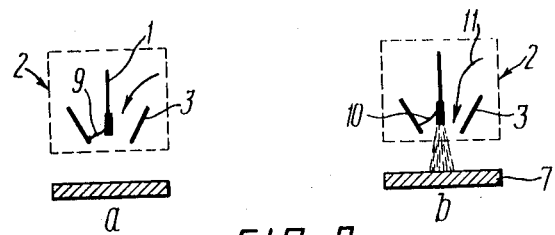
FIG. 2 is a schematic diagram of the process of striking a main arc in the known apparatus, where
  a. is the phase of striking high-frequency arc, and
  b. is the phase of the arcing of pilot and main arcs.

To obtain a better understanding, of the present invention it is expedient to consider first the process of striking a main arc embodied in the known apparatus (FIG. 1) incorporating an electrode 1 of a plasmatron 2 insulated from a nozzle 3 and connected to the negative terminal of a d.c. power source 4 whose positive terminal is connected to a workpiece 5. Interconnected between the electrode 1 of the plasmatron 2 and the nozzle 3 there is an oscillator 6 and, furthermore, the nozzle 3 of the plasmatron is connected to the d.c. power source in series with a resistor 7 and a switching device 8 which form the circuit of a pilot arc.

Figure 1:
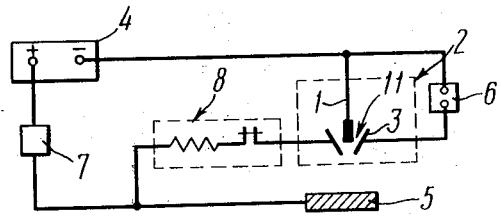

At the first stage illustrated in FIG. 2a, a high-frequency arc 9 is being struck between the electrode 1 and nozzle 3 of the plasmatron 2 due to the effect of a high-voltage and high-frequency discharge produced by the oscillator 6 (FIG. 1). This establishes a current-conducting path which makes the circuit of a pilot arc 10 (FIG. 2b). The power of the high-frequency arc 9 is selected so that neither the nozzle 3 nor the electrode 1 deteriorate no matter how long the arc is sustained in any plasma-forming medium. The second phase, which is the arcing of the pilot arc 10, is illustrated in FIG. 2b.

A point to be noted under the conditions when molecular gases or a mixture thereof is the plasma-forming medium is that an unceasing arcing of the pilot arc 10 will bring about thermal erosion of the nozzle 3 if it is a water-cooled one or, alternatively, will destroy the nozzle 3 practically in an instant if it is cooled by gas. The allowable period of arcing of pilot arc in apparatus for manual air-plasma working with air cooling of the parts exposed to heating in the plasmatron 2 is not over $2 \times 10^{-3}$ sec at currents between 80 and 100 A and no modern high-current switchgear is capable of producing so short an interval. On the other hand, any attempts to reduce the work current of the pilot arc 10 brings about a considerable increase in the floating voltage of the power source 4 to a level which is hazardous to the personnel and there is also an increase in the cost of manufacture conducive to poor economy.

Yet, in the end it is not the magnitude of the current of the unceasingly-arcing pilot arc 10 which assures failproof striking of main arc but the parameters of the flame of pilot arc bridging the gap between the electrode 1 of the plasmatron 2 and workpiece 5 under the influence of a gas 11 fed into the plasmatron. This fact became the prerequisite of the studies which have resulted in the provision of the disclosedme method for striking a main arc and apparatus embodying same.

Figure 3:
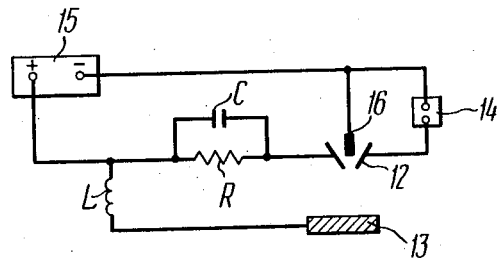
FIG. 3 is a circuit diagram of the apparatus for striking a main arc according to the invention wherein an inductance and a switching device are connected in series between the nozzle and workpiece, the known RC-circuit being used as the switching device.

Referring to FIG. 3 there is shown a circuit diagram of apparatus for striking a main arc wherein a switching device is connected in series between a nozzle and a workpiece 13, a RC-circuit and an inductance being used as the switching device. Incorporated into the circuit diagram is, firstly, a circuit inducting pilot arc current pulses which consists of an oscillator 14, a resistor R and a capacitor C connected in parallel. The parameters of the RC-circuit so formed are selected so that the frequency and on-off time ratio of pilot arc current pulses are adequate enough to produce an unceasing visually-monitored flame of pilot arc. Secondly, there is incorporated a circuit providing supply for the main arc, said circuit consisting of a thyristor d.c. power source 15 and an inductance L. The inductance is indispensable as a means of smoothing the high-frequency harmonics produced by the thyristor rectifying circuit.

A main arc is struck in the following way. A high-voltage and high-frequency discharge produced by the oscillator 14 jumps the gap between an electrode 16 and the nozzle 12 but a high-frequency arc initiated by the discharge does not jump from the electrode 16 to the workpiece 13 because the gap between the electrode 16 and workpiece 13 is by far wider than that between the electrode 16 and nozzle 12. The high-frequency arc just ionizes the gas inside the plasmatron, providing a current-conducting path which makes the circuit of pilot arc. Passing through this circuit are current pulses with a frequency and on-off time ratio controlled by the parameters of RC-circuit and said pulses produce a visually-monitored unceasing flame of pilot arc which makes the circuit of main arc. As soon as the main arc is struck, a capacitor C is being charged completely and passing through a resistor R is a leakage current whose magnitude depends on the value of the resistor.

Figure 4:
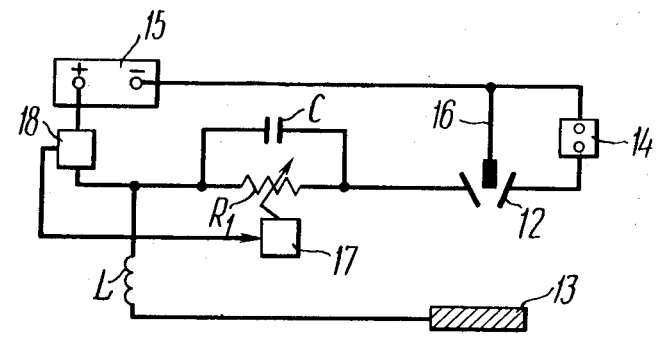
FIG. 4 is a circuit diagram of the apparatus for striking a main arc according to the method disclosed wherein a variable resistance is used in the $R_1C$-circuit.

Serving the purpose of reducing said current is a circuit illustrated in FIG. 4. It will be noted that a resistor $R_1$ in a $R_1C$ circuit is a variable one, is connected into the circuit of pilot arc in parallel with the capacitor C and is linked up with an actuator 17 to which there is connected a main arc current transducer 18 so that the resistor $R_1$ is set to its lowermost value when the pilot arc is arcing and to the maximum one when the main arc is arcing. This arrangement reduces the leakage current while a pilot arc is arcing to a value which practically eliminates any possibility of double arcing under the conditions of a normal functioning of main arc. At the same time, the fact that the resistor $R_1$ is set to its lower-most value when the pilot arc is arcing provides for such parameters of the $R_1C$-circuit which assure that the current pulses of pilot arc are produced with a frequency and on-off time ratio which are adequate for the formation of a visually-monitored unceasing flame of pilot arc. The remainder of said circuit is analogous to that of FIG. 3.

Figure 5:
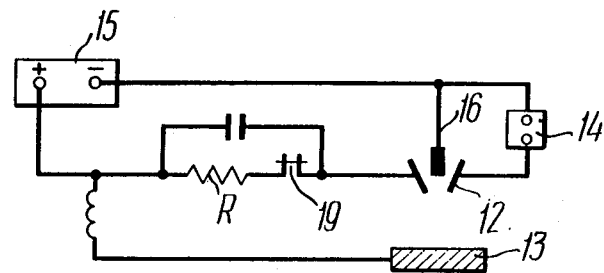
FIG. 5 is a circuit diagram of the apparatus for striking a main arc according to the method disclosed wherein a switch is connected into the RC-circuit in series with the resistance.

As an extreme case in the process described, there can occur a disruption of the leakage current circuit while the main arc is arcing. This case is embodied in a circuit diagram of FIG. 5 where a switch 19 is introduced into the RC-circuit in parallel with the resistor R, said switch being closed when the pilot arc is arcing and opened when the main arc is arcing.

Figure 6:
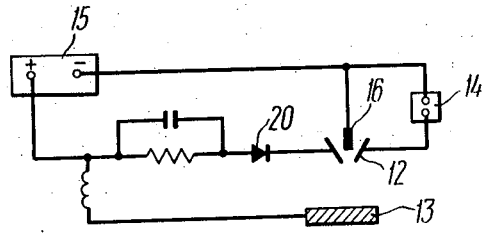
FIG. 6 is a circuit diagram of the contrivance for striking a main arc according to the invention wherein a silicon diode is connected between the nozzle and RC-circuit.

The circuit diagram of FIG. 6 serves the purpose of eliminating the possibility of double arcing not only under the conditions of stable functioning of the main arc but also in those cases when these stable conditions of functioning are sharply changed all of a sudden. A silicon diode 20 is introduced into the circuit of pilot arc between the nozzle 12 of the plasmatron and the RC-circuit so as to conduct current when the pilot arc is arcing. Since the discharge current of the capacitor C passing through the gap between the electrode 16 and the nozzle 12 in the case of double arcing opposes in direction the current of the pilot arc, the diode 20 fully eliminates the possibility of double arcing due to sudden sharp changes in the conditions.

It thus stands to reason that an unceasing visually-monitored flame of pilot arc required for a failproof bridging of the gap between the electrode 16 of plasmatron and workpiece 13 in order to strike main arc is obtained in the method disclosed and apparatus embodying same by selecting the amplitude of the current of pilot arc so that it is roughly equal to at least the steady current of main arc whereas the frequency and on-off time ratio of the current are selected so that a current averaging between 3 and 10 A is assured in the circuit of pilot arc throughout the arcing of this arc. Furthermore, the intensity of unceasing visually-monitored flame of pilot arc is controlled by the power of current pulses of pilot arc. This power, in turn, increases with the voltage across the discharge capacitor C which voltage depends on the difference existing betwen the floating voltage of the source of power 15 and the arcing voltage of pilot arc. This provides an explanation as to why the amplitude of pilot arc current is selected within the range $i \simeq I - 3$ I, taking into account that the arcing voltage of pilot arc in a medium of molecular gases or a mixture thereof approaches the floating voltage of the source of power 15. So, under the conditions of manual air-plasma working the floating voltage of the source of power 15 is 180 V and the voltage across the pilot arc is between 120 and 140 V.

On the other hand, for normal functioning of the electrode in a medium of chemically-active gases or mixtures thereof, the active surface of the electrode should be heated to a temperature between 2000° and 2500° C (Curtis C. E., a.o. I. Amer. Ceram. Soc., 1954, vol. 37, p.464–465). This requirement is a governing one in selecting the on-off time ratio of the current pulses of the pilot arc so that an average current between 3 and 10 A is assured throughout the arcing of pilot arc which is sufficient to heat the active surface of the electrode 16 as required, taking into account its geometrical dimensions and also the mass, dimensions and the conditions of cooling of electrode the holder. Said parameters are to be maintained with particular strictness in manual air-plasma working with a plasmatron in which all the parts exposed to heat are cooled by gas, for the aggregate rate of flow of air runs into 60 to 80 m³/hr in this case.

The apparatus disclosed (FIGS. 3 through 6) has been tested in manual air-plasma cutting of steels and non-ferrous metals. The source of power 15 was a thyristor rectifier with a floating voltage of 180 V. The material cut was steel varying in thickness between 1 and 40 mm and copper with a thickness between 1 and 30 mm. The circuit of the pilot arc included the resistor R and the capacitor C connected in parallel, R being 16 ohms and C being 3500 mfd. In series with the RC-circuit there was connected an inductance, L, equal to $1\times10^{-3}$h. The parameters of current pulses in the circuit of the pilot arc were as follows:

amplitude of current pulses of the pilot arc, $i = 600$ A;
pulse duration, $1\times10^{-3}$ or $2\times10^{-3}$ sec;
frequency, 22 to 24 Hz;
on-off time ratio, 45 to 50.

Current pulses like these passing through the circuit of pilot arc set up an unceasing visually-monitored flame of the pilot arc which makes the circuit of the main arc in the gap between the electrode 16 of plasmatron and workpiece 13. Failproof striking of the main arc was obtained at a distance of 5 to 20 mm between the end face of the nozzle 12 and workpiece 13, said distance corresponding to a distance of 20 to 35 mm between the electrode 16 and workpiece 13. In some tests a distance between 65 and 70 mm was achieved. The steady current of the main arc was 180 to 240 A and the voltage across the arc amounted to 130–160 V.

Test have proved that the apparatus disclosed is suitable for use when the electrode 16 is connected either to the negative terminal or to the positive one.

What is claimed is:

1. In a method for striking a main arc between a workpiece and an electrode of a plasmatron equipped with a nozzle, which is spaced from said electrode, including the steps of connecting the electrode of the plasmatron and the workpiece to opposing terminals of a power source; feeding a chemically-active plasmaforming gas into the space between the nozzle and the electrode; electrically connecting the space between the electrode and the nozzle of the plasmatron with an oscillator high-frequency discharge; closing the space between the electrode and the workpiece by a pilot arc flame formed with the aid of said plasmaforming gas which is fed into the plasmatron to form the main arc circuit; and disconnecting the pilot arc circuit; the improvement which comprises: maintaining the pilot arc current intermittently throughout the arcing of the pilot arc, the amplitude of said pilot arc current being maintained within the range $$i = 0.8I - 3I$$

where
$i$ = amplitude of pilot arc current and
$I$ = steady current of main arc;
and maintaining the frequency and on-off time ratio of the current of the pilot arc so as to ensure visually-controlled continuous flame throughout the arcing of the pilot arc.

2. A method for striking the main arc as claimed in claim 1 wherein the frequency and on-off time ratio of the current are maintained such that the average current in the circuit of the pilot arc is between 3 and 10A throughout the arcing of the arc.

3. A method for striking the main arc as claimed in claim 2 wherein the amplitude of the pilot arc current is 600 A.

4. Apparatus for striking a main arc between a workpiece and an electrode of a plasmatron equipped with a nozzle which is spaced from said electrode, in an environment of chemically-active plasma-forming gases, comprising: an electrical power source having a pair of electrical terminals, one terminal of which is electrically connected to the electrode of the plasmatron; an oscillator electrically connected to said electrode and said nozzle; a switching device and an inductance electrically connected in series between said nozzle and said workpiece, with the switching device being connected to the nozzle and the inductance being connected to the workpiece; the second terminal of said power source being connected between the inductance and the switching device to provide an intermittent current in the circuit between the electrode and nozzle; and means for feeding plasma-forming gas into the space between the electrode and nozzle to obtain an unceasing visually-monitored flame of a pilot arc and a main arc between the electrode and the workpiece.

5. Apparatus as claimed in claim 4 wherein a known RC-circuit is used a said switching device.

6. Apparatus as claimed in claim 5 wherein a diode is connected between said nozzle and a RC-circuit so that the diode conducts the pilot arc current.

7. Apparatus as claimed in claim 5 wherein the resistance in the RC circuit is a variable one and is linked up with an actuator capable of changing the magnitude of the resistance and interconnected with a main current transducer, the minimum value of the resistance being employed when the pilot arc is arcing and the maximum one when the main arc is arcing.

8. Apparatus as claimed in claim 7 wherein a switch is connected into the RC-circuit in series with a resistor R, said switch making the circuit when the pilot arc is arcing and breaking the circuit when the main arc is arcing.

* * * * *